(12) United States Patent
Brocke et al.

(10) Patent No.: US 7,403,493 B2
(45) Date of Patent: Jul. 22, 2008

(54) METHOD AND DEVICE FOR ACQUIRING ELECTRONIC INFORMATION ABOUT TRANSMISSION SPEEDS IN A NETWORK

(75) Inventors: Jens Brocke, Laatzen (DE); Frank Gläser, Hannover (DE); Ralf Köhler, Hannover (DE); Kurt Knuth, Hannover (DE)

(73) Assignee: Thomson Licensing, Boulogne Billancourt (FR)

( * ) Notice: Subject to any disclaimer, the term of this patent is extended or adjusted under 35 U.S.C. 154(b) by 687 days.

(21) Appl. No.: 10/931,016

(22) Filed: Aug. 31, 2004

(65) Prior Publication Data

US 2005/0047349 A1    Mar. 3, 2005

(30) Foreign Application Priority Data

Sep. 1, 2003    (DE) ................. 103 40 156

(51) Int. Cl.
*H04L 12/28* (2006.01)
(52) U.S. Cl. ............... 370/255; 370/252; 375/225
(58) Field of Classification Search ........... 370/468, 370/252, 255, 256; 709/223
See application file for complete search history.

(56) References Cited

U.S. PATENT DOCUMENTS

| | | | |
|---|---|---|---|
| 5,504,757 A * | 4/1996 | Cook et al. ............. | 370/468 |
| 5,687,319 A * | 11/1997 | Cook et al. ............. | 370/256 |
| 6,185,622 B1 * | 2/2001 | Sato ....................... | 709/233 |
| 6,829,225 B2 * | 12/2004 | Staats .................... | 370/255 |

* cited by examiner

*Primary Examiner*—Chi H. Pham
*Assistant Examiner*—Albert T Chou
(74) *Attorney, Agent, or Firm*—Joseph J. Laks; Robert Shedd; Reitseng Lin (57) ABSTRACT

The invention relates to a method and a device for acquiring electronic information about transmission speeds between nodes of an acyclical network, in particular of an IEEE 1394 bus network, precisely one transmission link being present between in each case two of the nodes of the network, and a respective PHY transmission speed of the transmission link being determined by a minimum value of PHY speeds of the nodes of the network lying on the transmission link, in the case of the method the respective PHY transmission speed being determined for one subset of the transmission links in the network by acquiring the PHY speeds of the nodes lying on the transmission links and electronically acquiring minimum values of the PHY speeds; and the respective PHY transmission speed being electronically acquired for another subset of the transmission links, which is different from the one subset of transmission links, on the basis of one of the PHY speeds which have been determined for the nodes lying on the transmission links of the one subset, and electronic topology information about a topology of the network being electronically acquired using optimization means which are formed in a node of the network. The device is provided for carrying out the method.

15 Claims, 4 Drawing Sheets

METHOD AND DEVICE FOR ACQUIRING ELECTRONIC INFORMATION ABOUT TRANSMISSION SPEEDS IN A NETWORK

This application claims the benefit, under 35 U.S.C. 119, of German patent application No. 10340156.3 filed Sep. 1, 2003.

The invention relates to a method and a device for acquiring electronic information about transmission speeds between nodes of an acyclical network, in particular of an IEEE 1394 bus network.

BACKGROUND OF THE INVENTION

A network is composed of electric/electronic devices which are connected using a data bus and between which data is exchanged via the bus. The electric/electronic devices are referred to as network nodes, or as nodes for short. If there is precisely one transmission path between two respective nodes in a network, the network is referred to as an acyclical network.

There are different network standards, depending on the data bus used and the electric/electronic devices connected to the data bus. A network standard to which a lot of attention has been paid recently is the standard IEEE 1394. The standard IEEE 1394 provides a standard which is suitable in particular for supporting the exchange of data between multimedia devices of any desired type. A data bus which is configured according to the IEEE 1394 standard can be connected both to a personal computer and its peripherals such as printers, scanners, CD-RW drives and hard disks and to home entertainment electronic devices such as video cameras or televisions.

In a network bus according to the IEEE 1394 standard or the standard IEEE 1394a, all the nodes must be able to transmit data at the speed S100, which corresponds to a transmission speed of approximately 100 Mbps. A node can optionally also support the speed S200 or the speeds S200 and S400. The maximum transmission speed for exchanged data between the individual nodes at the level of the bit transmission layer, the so-called PHY transmission speed, is determined here by the speeds of so-called physical layer chips (PHY chips) of the nodes involved in the physical exchange of data. In addition, each node with the so-called link-layer chip (link chip), which is arranged in the protocol hierarchy of the IEEE 1394 network above the PHY chip has a further speed determining component. The PHY chip and the link chip of a node can have different maximum speeds which are referred to below as the PHY speed or link speed of the node. The link chip of a node is, however, involved only in the transmission of data if the respective node itself is a starting node or destination node of a transmission of data. If a node merely passes on a transmission of data because it lies on the transmission link between the starting node and the destination node or nodes, only its PHY chip is involved in the transmission of data. The PHY transmission speed of a transmission of data between a starting node and one or more destination nodes of the network bus is equal to the minimum value of the PHY speeds of the nodes lying on the transmission link, including the starting node and the destination node or the destination nodes. The maximum actual transmission speed of a transmission of data is equal to the minimum value of the link speeds of the starting node and the destination node or the destination nodes and the PHY transmission speed of the transmission of data. With respect to an IEEE 1394 network, the invention is concerned only with the acquisition of the PHY transmission speeds within the IEEE 1394 network, and for this reason the link speeds of the respective nodes are not considered further. For a different acyclical network in which the PHY transmission speeds are identical to the actual transmission speeds, because apart from the PHY speeds of the nodes involved no further speeds of speed determining components have to be taken into account, the invention can also be used to acquire the actual transmission speeds. In what follows, the term transmission speed will be used in the sense of the maximum actual transmission speed, and the term PHY transmission speed will be used for the maximum physical data transmission speed for transmissions of data between network stations.

In an IEEE 1394 bus network, both asynchronous communications links and isochronous communications links can be set up between nodes. In order to ensure the highest possible data transmission rates on the network, it is advantageous to know the transmission speeds between the individual nodes of the network. If a communication is carried out between network nodes at the minimum supported speed, the speed S100, even though the nodes which are involved in the data exchange can carry out the exchange of data at a higher speed than the minimum network speed, bandwidth of the data bus is added. If, on the other hand, an attempt is made to set up a communication at a speed which is higher than the PHY speed of one of the nodes involved in the exchange of data, or higher than the link speed of the starting node or higher than the link speed of a destination node, this attempt fails since data cannot be passed on or transmitted or received in this one involved node. In order, therefore, to be able to define an optimum transmission speed for any exchange of data in the network, it is consequently necessary to know the transmission speeds between all the network nodes present in the network, which presumes knowledge of the respective PHY transmission speeds.

An acyclical network has a hierarchy. Any network node has a maximum of one parent node and no, one or a plurality of children nodes with which it is directly connected. These directly neighboring nodes are referred to as adjacent nodes. The PHY transmission speed between two neighboring nodes is obtained from the minimum value of the PHY speeds of the two adjacent nodes, or is unknown if one of the two PHY speeds is unknown.

If the structure of the network changes, the transmission speeds between the nodes of the network have to be determined afresh. In the case of a network which is embodied as an IEEE 1394 network, a reset operation (bus reset) is carried out on the data bus, in particular if an electric/electronic device is connected to the data bus or an electric/electronic device is disconnected from the data bus. In the case of a reset operation on the data bus, each IEEE 1394 node which is connected to the data bus transmits a self-ID information item (ID identification) to the other nodes. This ensures that every node in the network is informed of which other nodes are connected on the network. By reference to the self-ID information, which is transmitted with so-called self-ID packets, it is possible to determine a bus topology of the network bus. In particular, a uniquely defined integral ID code number can be assigned to each node with the aid of the self-ID packets. Which nodes are adjacent in the bus topology results from port status fields of the self-ID packets and from the knowledge of how the ID code numbers on an IEEE 1394 bus are assigned after a reset operation according to the port statuses of all the nodes on the bus. A person skilled in the art is familiar with the procedure for assigning the ID code numbers so that at this point a detailed presentation will not be given. In addition, the self-ID packets contain information about the PHY speed of the respective node.

U.S. Pat. No. 5,504,757 discloses a method for determining a transmission speed between any two nodes of an IEEE 1394 network in which a common preceding node is determined for a starting node and a destination node, and in each case the transmission speed from the starting node to the common preceding node and from the destination node to the common preceding node is determined, and the transmission speed from the starting node to the destination node is then set to be equal to the minimum value of the transmission speed from the output node to the common preceding node, and to the speed from the destination node to the common preceding node. The known method does not acquire the actual transmission speeds including the link speeds, but rather only the PHY transmission speeds. In the proposed method, the transmission speed from the starting node to the destination node is determined in each case directly before a communications link is set up.

If communications links are frequently implemented in succession between the same nodes of the network without a bus reset operation having taken place in the meantime, the method steps for determining the maximum transmission speed are carried out repeatedly, which amounts to wasting computing power.

SUMMARY OF THE INVENTION

The invention is based on the object of providing a method and a device which contribute to an acceleration of the exchange of data in an acyclical network, in particular an IEEE 1394 bus network.

The object is achieved by means of a method having the features according to the independent claim 1, and a device having the features according to the independent claim 10.

The invention is based on the idea that an acceleration of the exchange of data on the acyclical network is brought about by selecting the maximum possible transmission speed for each transmission. In order to determine this transmission speed, knowledge of the PHY transmission speed between the involved starting node and the involved destination node or nodes is required. In order to determine the PHY transmission speeds of all the connecting links in the acyclical network, electronic information which provides knowledge of the topology of the network and the respective PHY speed of the individual nodes of the network, is acquired and evaluated. A further basis of the invention is the idea that the PHY transmission speed has to be acquired only for a subset of the transmission links from the set of all the transmission links between the nodes of the network, i.e. only for a number of connection configurations of all the transmission links between the nodes of the network, this being done by means of the respective minimum value of the PHY speeds of the nodes lying on the respective transmission link, including the node itself, between which the PHY transmission speed is determined. For another subset of the transmission links, the PHY transmission speed is acquired from a PHY speed which has been evaluated when the PHY transmission speeds were acquired for a transmission link of the one subset, and from the electronic topology information, for example the information stating how the ID code numbers are allocated in relation to one another in the network as a function of the arrangement of the nodes in the network. Consequently, for the transmission links of the other subset it is not necessary to acquire and evaluate all the PHY speeds of the nodes lying on the respective transmission links of the other subset. This reduces the overall number of method steps to be carried out in order to determine the electronic information about the PHY transmission speeds, and consequently causes the determination of the PHY transmission speeds to be accelerated. The determination of the PHY transmission speed can also include a characterization of the information about a PHY transmission speed as being unknown if the electronic information about the PHY speed of a node lying on the transmission link is unknown or invalid.

The method is accelerated further by forming an electronic table from the acquired electronic information about the PHY transmission speeds and storing the electronic table in a table memory. This embodiment affords the advantage that the provision of the electronic information about the PHY transmission speeds between the nodes of the network allows unnecessary computing steps, which are carried out in the method described above according to the prior art, to be eliminated. In the method according to the prior art, the PHY transmission speed is in fact determined afresh before each exchange of data between two nodes even if no reset operation has occurred since the PHY transmission speed was last determined. In this embodiment of the method according to the invention, each PHY transmission speed between two nodes is determined only once between two reset operations on the network bus, and the associated information is then stored in the electronic table with the information about the PHY transmission speeds. Information about the respective PHY transmission speeds can then be extracted from this table for any desired combination of nodes of the network without having to determine the data afresh beforehand. The need to determine the PHY transmission speeds twice is eliminated.

Another advantageous development of the method according to the invention provides for the PHY transmission speeds which have already been acquired to be taken into account during the electronic acquisition of the minimum values of the PHY speeds of the nodes lying on the respective transmission links of the one subset. This embodiment provides the advantage that when the PHY transmission speeds of the transmission links of the one subset are determined by means of the respective minimum value of the PHY speeds of the nodes lying on the respective transmission link, it is possible to have recourse to already acquired PHY transmission speeds of transmission links which represent component links of the transmission link in question. As a result, the PHY transmission speed of the transmission link in question can be acquired starting from the PHY transmission speed of the respective component link without the method having to determine afresh the PHY transmission speed of, the respective component link from the PHY speeds of the involved nodes. This reduces again the overall number of method steps to be carried out in order to determine the electronic information about the PHY transmission speeds.

In a network in which each of the nodes is assigned an ID code number and each node is directly connected to a number of adjacent nodes, the adjacent nodes being able to comprise a maximum of one parent node and no, one or a plurality of children nodes, and the ID code number of each of the nodes being higher than the ID code numbers of all of its children nodes, one preferred embodiment comprises the following steps which are carried out automatically using a device which is arranged in one of the nodes of the network:

a) a node with a lowest ID code number is defined from a set of the nodes for which the PHY transmission speeds to all the nodes have not yet been determined, as a current starting node (A) and as a current switching node (V);

b) a node with a highest ID code number is defined from a set of the adjacent nodes of the current switching node (V) to which a PHY transmission speed from the current starting node (A) has not yet been determined, as a current destination node (Z) if this set is not empty, and otherwise the step e) is carried out;

c) the PHY transmission speed (SPD (A, Z)) from the current starting node (A) to the current destination node (Z) is acquired;

d) the ID code number of the current destination node (Z) is stored in a switching node ID stack memory and the step b) is iterated;

e) an ID code number is read in from a switching node ID stack memory and the associated node is defined as a current switching node (V) and the steps b) to d) are iterated for as long as the switching node ID stack memory still contains at least an ID code number of a node;

f) the steps a) to e) are repeated for as long as the set of the nodes for which all the PHY transmission speeds to all the nodes have not yet been determined comprises at least two nodes.

One advantageous embodiment of the invention provides that when the current destination node (Z) is defined from the set of the adjacent nodes for which a PHY transmission speed from the current starting node (A) has not yet been determined, nodes whose ID code number is lower than the ID code number of the current starting node (A) are not taken into account, and the values of the PHY transmission speeds from the current starting node (A) to the nodes whose ID code number is lower than the ID code number of the current starting node (A) are set to be equal to the corresponding values of the PHY transmission speeds from the respective nodes whose ID code number is lower than the ID code number of the current starting node (A) to the current starting node (A). This embodiment has the advantage that the knowledge that the PHY transmission speed from the starting node to the destination node is equal to the PHY transmission speed from the destination node to the starting node is taken into account. As a result, all that is necessary in each case is to determine the PHY transmission speeds from a starting node to destination nodes whose ID code number is higher than the ID code number of the starting node.

A further advantageous refinement of the invention provides that a value of a PHY speed of the current starting node (A) is acquired and if this value is unknown or corresponds to the minimum network speed, the values of the PHY transmission speeds from the current starting node (A) to nodes of the set of the nodes to which the PHY transmission speed from the current starting node (A) are set to be equal to the value of the PHY speed of the current starting node (A). This embodiment exploits the fact that in the acyclical network the PHY transmission speeds to all the other nodes from the starting node are determined by the speed value of the network if said value is unknown, or corresponds to the minimum network speed.

A different embodiment of the method according to the invention consists in the fact that a value of a PHY speed of the current destination node (Z) is acquired and if the value of the PHY speed of the current destination node (Z) is unknown or equal to the value of the minimum network speed, and the current destination node (Z) is the parent node of the current starting node (A), the values of the PHY transmission speeds from the current starting node (A) to nodes whose ID code number is higher than the ID code number of the current starting node (A) are set to be equal to the value of the PHY speed of the current destination node (Z). This embodiment takes into account the fact that all the transmission links from the current starting node to destination nodes with an ID code number higher than the ID code number of the current starting node comprise the transmission link between the current starting node and the current destination node since the current destination node is the parent node of the current starting node. As a result, none of these PHY speeds can be higher than the PHY speed of the current destination node.

One development of the invention provides that a value of a PHY speed of the current switching node (V) is acquired, and if the value of the PHY speed of the current switching node (V) is unknown or corresponds to the minimum network speed, the values of the PHY transmission speeds from the current starting node (A) to nodes of the set of the nodes to which the PHY transmission speed from the current starting node (A) is not yet determined and whose ID code number is higher than the ID code number of the current starting node (A) and lower than the ID code number of the current switching node (V) are set to be equal to the value of the PHY speed of the current switching node (V). This embodiment takes into account the fact that the PHY transmission speeds to all the nodes with an ID code number lower than the ID code number of the current switching node and higher than the ID code number of the current starting node whose transmission path does not include the current switching node have already been determined. At the remaining nodes whose ID code number is lower than the ID code number of the current switching node and higher than the ID code number of the current starting node, the transmission path comprises the current switching node. As a result, the PHY transmission speed from the current starting node to those nodes is determined by the PHY speed of the current switching node if said speed is unknown or corresponds to the minimum network speed.

One development of the method according to the invention consists in the fact that a maximum ID code number of a node of a set of the nodes to which the PHY transmission speed from the current starting node (A) has already been determined is determined, and if the ID code number of the current switching node (V) is equal to the maximum ID code number and the value of the PHY speed of the current switching node (V) is unknown or corresponds to the minimum network speed, the values of the PHY transmission speeds from the current starting node (A) to nodes with an ID code number higher than the ID code number of the current switching node (V) is set to be equal to the value of the PHY speed of the current switching node (V).

One embodiment of the device according to the invention provides that a microprocessor comprises the control means, the starting node definition means, the switching nodes definition means, the destination nodes definition means, the switching node ID stack memory and the speed determining means. This embodiment can be manufactured particularly easily and compactly.

The features of the developments in the other dependent claims of the device for determining the electronic information about PHY transmission speeds correspondingly have the advantages specified in conjunction with associated features in the dependent method claims.

BRIEF DESCRIPTION OF THE DRAWINGS

The invention will be explained in more detail below by means of exemplary embodiments and with reference to a drawing, in which.

DETAILED DESCRIPTION OF PREFERRED EMBODIMENTS

Figure 1:
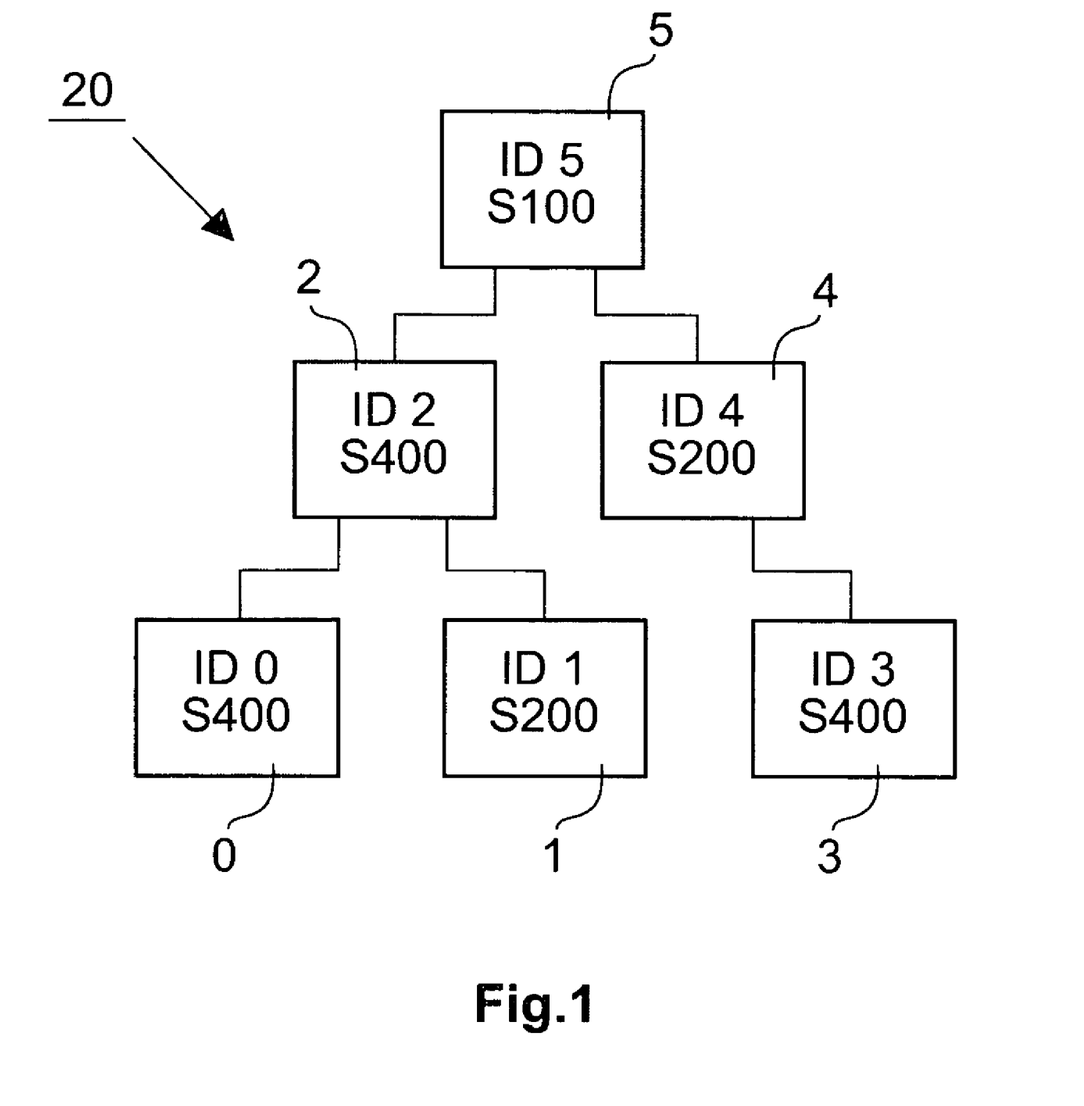
FIG. 1 shows an exemplary network topology.

FIG. 1 shows a network topology of an acyclical network 20. The network comprises nodes 0-5. Each node is assigned an identification (ID) after a bus reset operation. Furthermore, each of the nodes 0-5 has a PHY speed at which it can transmit and receive physical data. After a bus reset operation, each of the nodes 0-5 transmits a self-ID packet or a plurality of self-ID packets to all the other nodes 0-5. The PHY speeds of the nodes 0-5 and the topology of the network 20 can be determined in a uniquely defined way by means of the self-ID packet data provided that the information about the PHY speeds is valid and the topology information is consistent. In addition, the self-ID packets reveal which of the nodes 0-5 are directly adjacent. A PHY transmission speed between two adjacent nodes results from a minimum value of the PHY speeds of the adjacent nodes or is unknown if the information about the PHY speed of one of the two or both nodes is unknown or invalid. Which nodes are adjacent results from the port status fields of the self-ID packets and from knowledge of how the ID code numbers in the network 20 are assigned after a bus reset operation (bus reset) according to the port statuses of all the nodes on the bus.

The bus topology of the network 20 provides for any desired node of the network 20, for example a node with an ID code number 2, to have a maximum of one parent node, in this case a node with an ID code number 5, and no, one or a plurality of children nodes, in this case a node with an ID code number 0 and a node with an ID code number 1, as direct neighbors. The ID code numbers are allocated in such a way that the ID code number of any desired node, for example of the node 2, is higher than the ID code numbers of all of its children nodes, in this case the nodes 0 and 1. In addition, the network topology is configured in such a way that there is in each case only one transmission path between any two nodes of the network 20. Such a network is referred to as an acyclical network.

In order to determine a PHY transmission speed from a starting node (A) with and ID code number ID(A), for example the node 0, to a destination node (Z) with an ID code number ID(Z), for example the node 5 with the ID code number 5, a PHY transmission speed SPD (A,V) between the starting node (A) 0 and a switching node (V) 2 with an ID code number ID(V)=2 is firstly determined. The PHY transmission speed SPD (A, V) is obtained in a uniquely defined way as the minimum value of the PHY speeds of the starting node (A) 0 and of the switching node (V) 2 or is unknown if at least one of the two PHY speeds is unknown.

Subsequently, a PHY transmission speed SPD (V, Z) between the switching node (V) 2 and the destination node (Z) 5 is determined in an analogous fashion from the PHY speed of the switching node (V) 2 and a PHY speed of the destination node (Z) 5. The PHY transmission speed SPD (A, Z) results in a uniquely defined way from the minimum value of the PHY transmission speed SPD (A, V) between the starting node (A) 0 and the switching node (V) 2 and the PHY transmission speed SPD (V, Z) between the switching node (V) 2 and the destination node (Z) 5. The PHY transmission speed SPD (A, Z) is unknown if at least one of the two PHY transmission speeds SPD (A, V) or SPD (V, Z) is unknown.

If, for example, the PHY transmission speed from the node with the ID code number 0 to the node with the ID code number 4 is to be acquired, the node with the ID code number 0 is the starting node (A) and the node with the ID code number 4 is the destination node (Z). On the transmission path between the starting node (A) 0 and the destination node (Z) 4 there are the nodes with the ID code number 2 and the ID code number 5. The nodes with the ID code number 2 and the ID code number 5 constitute switching nodes. In order to determine the PHY transmission speed SPD (A, Z), a PHY transmission speed SPD (A, V1) is firstly determined between the starting node (A) 0 and a first switching node (V1) 2. A PHY transmission speed SPD (V1, V2) is then determined between the first switching node (V1) 2 and a second switching node (V2) 5. A PHY transmission speed SPD (A, V2) results from the minimum value of the PHY transmission speeds SPD (A, V1) and SPD (V1, V2) or is unknown if at least one of the two PHY transmission speeds is unknown. After a PHY transmission speed (SPD (V2, Z) has been determined between the second switching node (V2) 5 and the destination node (Z) 4, the PHY transmission speed SPD (A, Z) from the starting node (A) 0 to the destination node (Z) 4 is obtained from the minimum value of the PHY transmission speeds SPD (A, V2) and SPD (V2, Z), or is unknown if at least one of the two PHY transmission speeds is unknown. In this way, the PHY transmission speeds between any desired nodes of the local network bus can be determined incrementally.

One embodiment of the method for determining the electronic information about the PHY transmission speeds is described below. After a bus reset operation, self-ID packets are received and stored in a storage medium in order to be available for evaluation. It is also possible to determine the PHY speeds and the topology information from the self-ID packets and to make available only this information for further processing.

Firstly, a node with the lowest ID code number, that is to say the node with the ID code number 0, is defined as current starting node and additionally as current switching node.

From a set of adjacent nodes of the current switching node, in each case a node with the highest ID code number is selected and defined as current destination node. In the selected example (cf. FIG. 1) this is the node with the ID code number 2. A PHY transmission speed SPD (A, V) from the current starting node (A) 0 to the current switching node (V) 0 is in this case equal to the PHY speed of the starting node (SPD (A, V)=SPD (A, A)) or is unknown if the PHY speed of the starting node is unknown. In addition, a PHY transmission speed SPD (V, Z) is determined between the current switching node (V) 0 and the current destination node (Z) 2. The PHY transmission speed SPD (A, Z) is then determined between the starting node (A) 0 and the destination node (Z) 2, and is obtained in a uniquely defined way from the minimum value of the PHY transmission speeds SPD (A, V) and SPD (V, Z), or is unknown if at least one of the two PHY transmission speeds is unknown.

The ID code number of the destination node is stored in a switching node ID stack memory. The information about the specific PHY transmission speed SPD (A, Z) can be stored in electronic form in a table with information about the PHY transmission speeds in a table memory.

A node with the highest ID code number is then selected from the set of the adjacent nodes of the current switching node to which a PHY transmission speed from the current starting node has not yet been determined, and is defined as a new current destination node. The method steps described above for determining the PHY transmission speed SPD (A, Z) from the current starting node to the current destination node are then carried out afresh.

If the set of the adjacent nodes of the switching node to which a PHY transmission speed from the starting node has not yet been determined is empty, the ID code number which has been stored last in the switching node ID stack memory is read in, and the node which corresponds to the read-in ID code number is defined as the new current switching node.

As described above, the PHY transmission speeds from the current starting node to the adjacent nodes of the new current switching node are then determined, starting from the new current switching node, in a sequence of decreasing ID code numbers. Here, when the PHY transmission speed from the current starting node to the current switching node is being determined it is possible to have recourse to the value which is stored in the table memory if the value in the table memory has been stored. If all the PHY transmission speeds to the adjacent nodes of the new current switching node have been determined starting from the current starting node for said new current switching node, the next ID code number is read in from the switching node ID stack memory and the method steps for the definition of a current switching node are repeated. However, should the switching node ID stack memory be empty, the PHY transmission speeds from the current starting node to all the other nodes of the network 20 have been determined. The method is continued by selecting a node with the lowest ID code number from the set of the nodes for which a PHY transmission speed transmission speed to all the other nodes has not yet been determined, and defining it as the current starting node and current switching node. All the PHY transmission speeds between the nodes 0-5 (cf. FIG. 1) of the network 20 are thus determined incrementally in pairs.

An electronic table with information about the PHY transmission speeds can be formed from the information about the PHY transmission speeds and stored in the table memory. The storage of the information about the specific PHY transmission speeds between the nodes of the network provides the explained advantages over the method according to the prior art which was described above, irrespective of the method used to determine the PHY transmission speeds.

The method described can be optimized. A first way of optimizing it consists in the fact that, when a node is selected from the set of the adjacent nodes of the switching node to which a PHY transmission speed from the starting node has not yet been determined, those nodes whose ID code number is lower than the ID code number of the current starting node are not taken into account. This optimization is based on the fact that the PHY transmission speed from a first node, for example the node with the ID code number 0, and a second node, for example the node with the ID code number 5, is equal to the PHY transmission speed from the second node with the ID code number 5 to the first node with the ID code number 0. As a result, the PHY transmission speed between two nodes only needs to be determined once. According to the embodiment of the method which is presented above it is advantageous in each case to calculate only PHY transmission speeds to nodes whose ID code number is higher than the ID code number of the current starting node. One consequence of this optimization is that the method steps for a node with the highest ID code number in the network 20, a so-called root node, here the node with the ID code number 5, must not be carried out under any circumstances.

A second optimization of the method provides that, after a current starting node has been defined, its PHY speed is determined and it is detected whether the PHY speed of the current starting node corresponds to the minimum network speed or is unknown. If this is the case, the PHY transmission speeds from the current starting node to all the other nodes are also equal to the minimum network speed or are unknown since the PHY transmission speeds are all determined in each case by the PHY speed of the current starting node. In this case, the method is continued with the current starting node being determined afresh.

One development of the method provides that a PHY speed is determined for the current destination node if it is the parent node of the current starting node. If the PHY speed of the current destination node corresponds to the minimum network speed or if it is unknown, the values of the PHY transmission speeds between the current starting node and nodes whose ID code number is higher than the ID code number of the current starting node, are set to be equal to the value of the PHY speed of the current destination node, i.e. they are set to be equal to the value of the minimum network speed or are defined as unknown. In the context of the method described here the setting of the value of a PHY transmission speed to be equal to the value of a PHY speed therefore always comprises defining the value of the PHY transmission speed as unknown if the PHY speed is unknown. The method is then continued with the method step for defining a new current starting node.

In order to illustrate this optimization, FIG. 1 will be examined once more for the purpose of explanation. Assuming that the PHY transmission speeds for the nodes with the ID code number 0 and 1 have already been determined, the node 2 with the ID code number 2 is defined as current output node. In addition, the node 2 with the ID code number 2 is defined as current switching node. Only the node 5 with the ID code number 5 is associated with the set of the adjacent nodes to which a PHY transmission speed from the current starting node has not yet been defined. This node 5 is defined as current destination node. Since said node is at the same time the parent node of the current starting node 2 with the ID code number 2, its PHY speed is determined. Said speed is S100 and it corresponds to the minimum network speed. Since the transmission paths from the current starting node 2 with the ID code number 2 to nodes with an ID code number higher than the ID code number of the current starting node include the current destination node 5 with the ID code number 5, the values of the PHY transmission speeds to these nodes with an ID code number higher than the ID code number of the current starting node, that is to say the PHY transmission speeds to the nodes with the ID code numbers 3, 4 and 5 are set to be equal to the value of the minimum network speed S100. The method is continued by defining a current starting node afresh. The node with the lowest ID code number in the set of the nodes for which the PHY transmission speeds to all the other nodes of the network 20 have not yet been determined is the node 3 with the ID code number 3. The node 3 with the ID code number 3 is consequently defined as current starting node and the method is continued as described above.

A further optimization of the method is that the PHY speed of the current switching node is determined. If the PHY speed of the current switching node is equal to the minimum network speed of the network 20 or is unknown, the values of the PHY transmission speeds from the current starting node to nodes of the set of the nodes to which the PHY transmission speed from the current starting node has not yet been determined and whose ID code number is higher than the ID code number of the starting node and lower than the ID code number of the current switching node are set to be equal to the value of the PHY speed of the current switching node. That is to say the values of the PHY transmission speeds from the current starting node to all the nodes whose ID code number is higher than the ID code number of the current starting node and lower than the ID code number of the current switching node and to which a PHY transmission speed from the current starting node has not yet been determined are set to be equal to the value of the minimum network speed, or are defined as unknown.

This is a consequence of the fact that the nodes of the set of the nodes to which the PHY transmission speed from the current starting node has not yet been determined and whose ID code number is higher than the ID code number of the current starting node and lower than the ID code number of the current switching node lie in branches of the network which start from children nodes of the current switching network.

Figure 2:
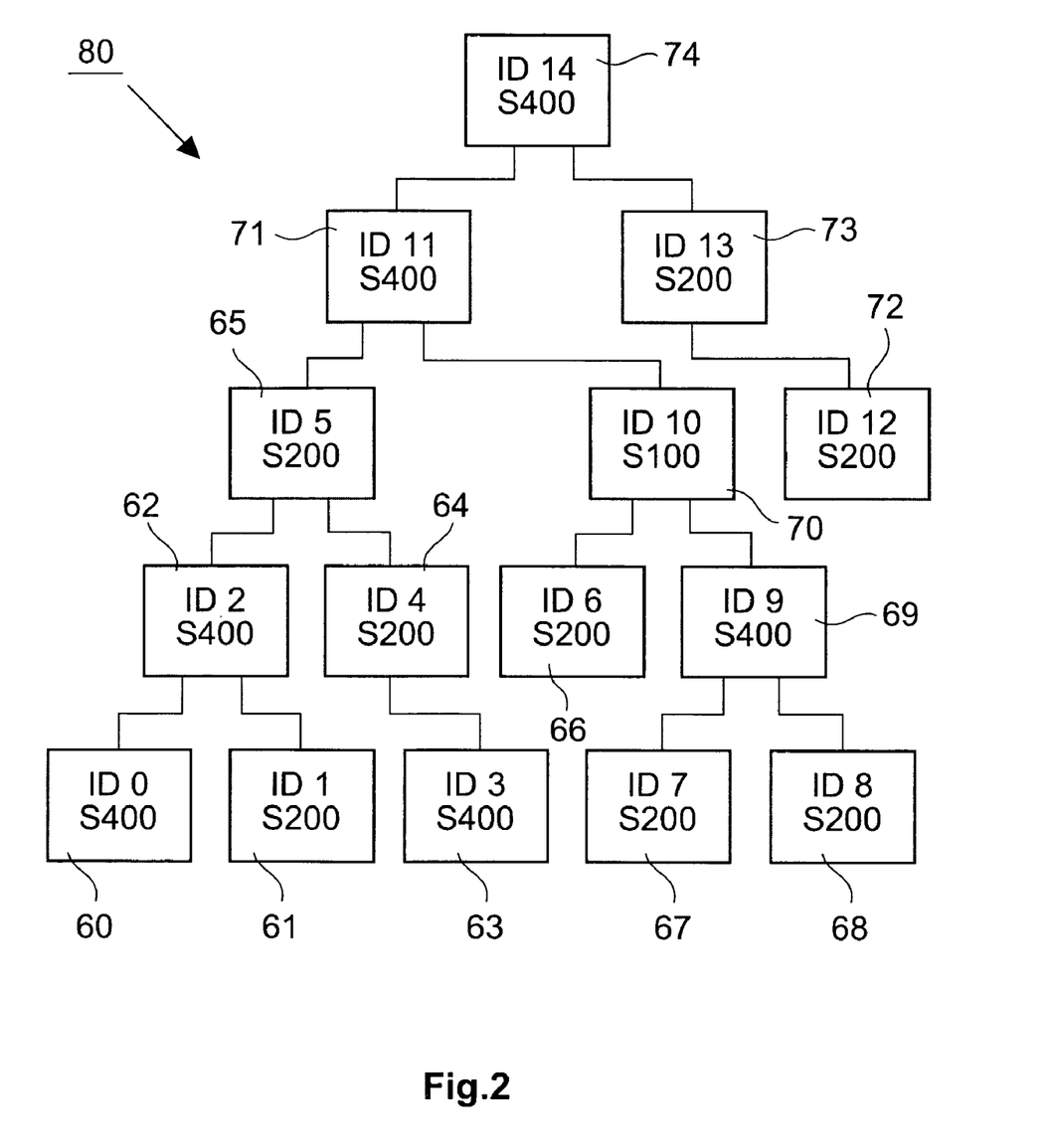
FIG. 2 shows a different network topology.

This optimization step is explained in more detail with reference to FIG. 2. The PHY transmission speeds from a node 60 with the ID code number 0 and a node 61 with the ID code number 1 to other nodes 62-74 of a network 80 have already been determined. The node 62 with the ID code number 2 is thus defined as current starting node. The method for determining the PHY transmission speeds is continued successively. Here, the nodes 62, 65, 64, 63 and 71 with the ID code numbers 2, 5, 4, 3 and 11 are used as current switching nodes. After all the method steps for these current switching nodes have been carried out, the ID code number 10 is located "at the top" on the switching node ID stack memory, and the ID code number 14 is located "below it". The ID code number 10 is read in from the switching node ID stack memory, and the node 70 with the ID code number 10 is defined as current switching node.

When the PHY speed of the current switching node is determined, it is detected that the node 70 with the ID code number 10 is being used as PHY speed S100, which corresponds to the minimum network speed. The set of nodes for which a PHY transmission speed from the current starting node 62 with the ID code number 2 has not yet been determined includes the nodes 66, 67, 68, 69, 72 and 73 with the ID code numbers 6, 7, 8, 9, 12 and 13. Of these nodes, the nodes 66, 67, 68 and 69 with the ID code numbers 6, 7, 8 and 9 have ID code numbers which are higher than the ID code number of the current starting node 62 with the ID code number 2, and lower than the ID code number of the current switching node 70 with the ID code number 10. These nodes are all located in children branches which include a child node of the current switching node 70 with the ID code number 10, that is to say one of the nodes 66 or 69. As a result, the PHY transmission speeds from the current starting node 62 with the ID code number 2 to the nodes 66, 67, 68 and 69 with the ID code numbers 6, 7, 8 and 9 of the set of the nodes to which a PHY transmission speed from the current starting node 62 with the ID code number 2 has not yet been determined are determined by the PHY speed of the current switching node 70 with the ID code number 10. The values of the PHY transmission speeds from the current starting node 62 with the ID code number 2 to the nodes 66, 67, 68 and 69 with the ID code numbers 6, 7, 8 and 9 are consequently set to be equal to the value of the minimum network speed S100. Since the switching node ID stack memory still contains the ID code number 14, the method is continued by reading in the ID code number 14 from the switching node ID stack memory and subsequently defining the node 14 as current switching node.

It is noted that the conclusion which has just been drawn cannot be drawn until the node 70 with the ID code number 10 is used as current switching node in the method.

Although it has already been noted that the PHY speed of the node 70 with the ID code number 10 corresponds to the minimum network speed if said node is being used as the current destination node, it is, however, not ensured at this time that PHY transmission speeds to all the nodes with an ID code number which is less than the current destination node ID code number which is present at this time and higher than the current starting node ID code number to which the transmission path from the current starting node 62 does not include the node 70 have already been evaluated. A specific example of this is explained in more detail below with respect to FIG. 3.

A further optimization of the method provides that, in the event of the PHY speed of the current switching node corresponding to the minimum network speed or being unknown, a maximum ID code number of the nodes to which the PHY transmission speed from the current starting node has already been determined is additionally determined. If this maximum ID code number corresponds to the ID code number of the current switching node, the values of the PHY transmission speeds from the current starting node to nodes whose ID code number is higher than the ID code number of the current switching node are all set to be equal to the value of the minimum network speed, or defined as unknown, if the PHY speed of the current switching node corresponds to the minimum network speed or is unknown. The switching node ID stack memory is in this case empty and the method is continued with the selection of a current starting node from the set of the nodes for which all the PHY transmission speeds to the other nodes of the network have not yet been determined.

The optimization case which is illustrated last will be explained once more by way of example with reference to FIG. 3. The PHY transmission speeds are already determined for nodes 100 and 101 with the ID code numbers 0 and 1, to the other nodes 102-111 of a network 120. The node 102 with the ID code number 2 is determined as current starting node since it has the lowest ID code number of the set of nodes for which all the PHY transmission speeds to all the other nodes have not yet been determined. In the method sequence, the nodes 102, 105, 104 and 103 with the ID code numbers 2, 5, 4 and 3 are used as current switching nodes. After the current switching node 103 with the ID code number 3 has been processed, the switching node ID stack memory contains the ID code number 8. The latter is read in from the stack and the associated node 108 with the ID code number 8 is defined as current switching node. When the PHY speed of the current switching node 108 with the ID code number 8 is determined, it is detected that it corresponds to the minimum network speed S100. In addition, the maximum ID code number of a node of a set of the nodes to which the PHY transmission speed from the current starting node 102 with the ID code number 2 has already been determined is determined. The maximum ID code number is the ID code number 8 in this case. Since it corresponds to the ID code number of the current switching node, the set of the nodes to which a PHY transmission speed from the starting node has not yet been determined includes all the nodes which lie in a branch of a child node of the current switching node which has not yet been evaluated, and all the nodes which lie in the branch of the parent node of the current switching node, provided that the current switching node is not a root node of the network 120. Transmission paths from the current starting node 102 with the ID code number 2 to all these nodes 106, 107, 109, 110 and 111 thus include the current switching node 108 so that the PHY transmission speeds are determined by the PHY speed of the current switching node 108. The values of the PHY transmission speeds from the current starting node 102 to nodes 109, 110 and 111 with an ID code number which is higher than the ID code number of the current switching node 108 are consequently set to be equal to the value of the minimum network speed. If the PHY speed of the current switching node 108 is unknown, the values of the PHY transmission speeds from the current starting node 102 with the code number 2 to the nodes 109, 110 and 111 with an ID code number which is higher than the ID code number of the current switching node 108 are also defined as unknown.

For the nodes 106 and 107 with the ID code numbers 6 and 7 of the set of the nodes to which the PHY transmission speed from the current starting node 102 has not yet been determined and whose ID code number is higher than the ID code number of the current starting node 102 and lower than the ID code number of the current switching node 108, the value of the PHY transmission speed from the current starting node 102 with the ID code number 2 can also be set to be equal to the value of the PHY speed of the current switching node 108 or defined as being unknown if the PHY speed of the current switching node 108 is unknown. However, this conclusion is also possible without evaluating the ID code number of the current switching node, as has already been described above.

Since all the PHY transmission speeds are determined starting from the current starting node 102 with the ID code number 2, the method is continued with the selection and definition of a subsequent current starting node.

Figure 3:
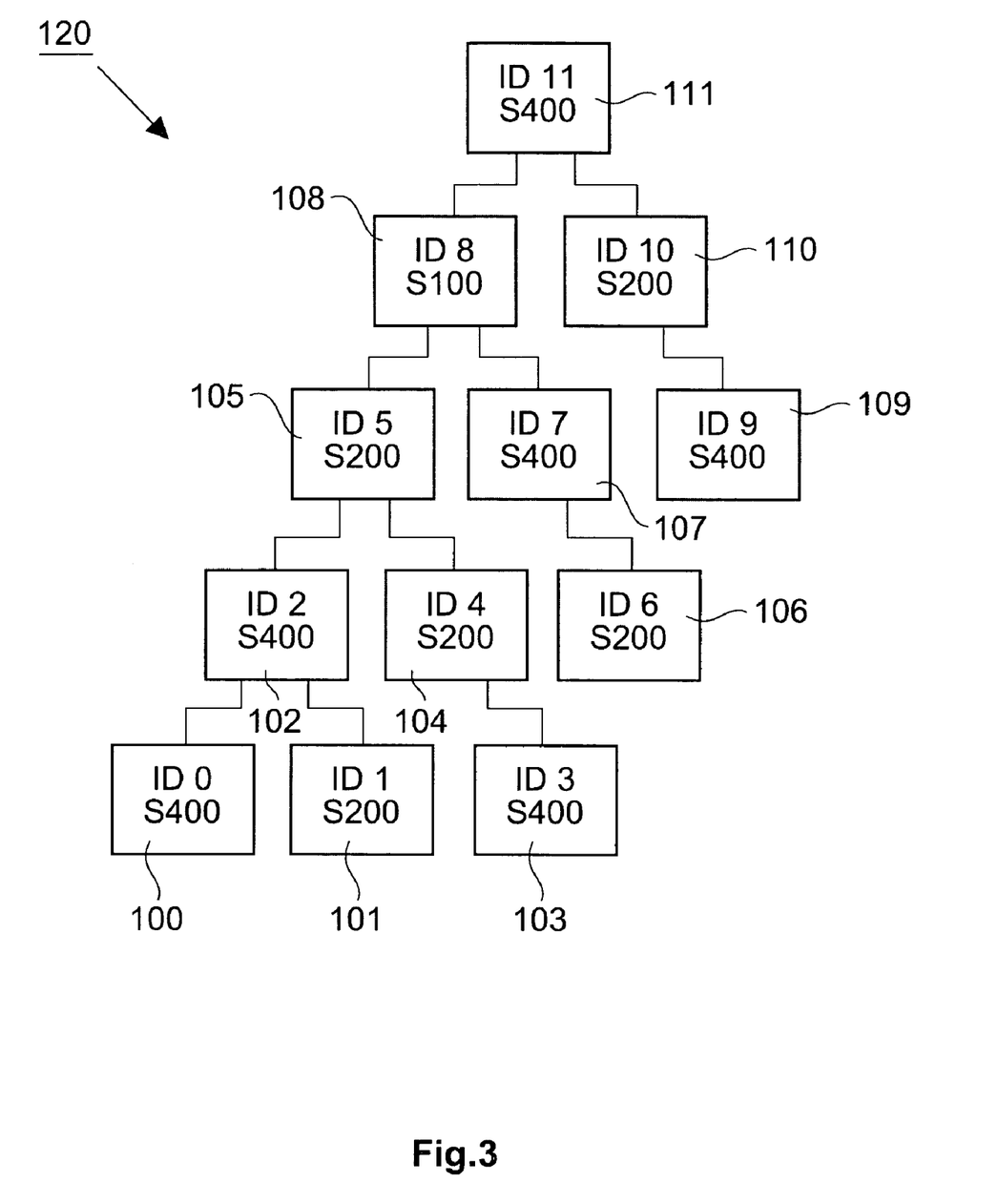
FIG. 3 shows a further network topology.

However, by means of the example in FIG. 3 it is also possible to explain well once more that conclusions can be drawn from the PHY speed of the node 108 with the ID code number 8 with respect to the PHY speeds from the current starting node 102 with the ID code number 2 to other nodes only if the node 108 with the ID code number 8 is the current switching node. Although, as has already been the case previously with the method when the node 105 with the code number 5 is the current switching node, it is detected for the destination node 108 which was the current node at that time and had the ID code number 8 that its PHY speed corresponds to the minimum network speed, at this time although the PHY transmission speeds from the current starting node 102 with the ID code number 2 to the network nodes 103 and 104 with the ID code numbers 3 and 4, whose respective ID code number is higher than the ID code number of the current starting node 102 and lower than the respective ID code number of the current switching node 105 and of the current destination node 108, have not yet been evaluated. As a result, the fact that it is detected that the PHY speed of the network node 108 with the ID code number 8 corresponds only to the minimum network speed, provides only an indication that PHY transmission speeds on transmission paths which include the destination node 108 with the ID code number are determined by said node, but the network nodes to which these transmission paths lead cannot yet be easily ascertained if the network node 108 with the ID code number 8 is still being used as a current destination.

Figure 4:
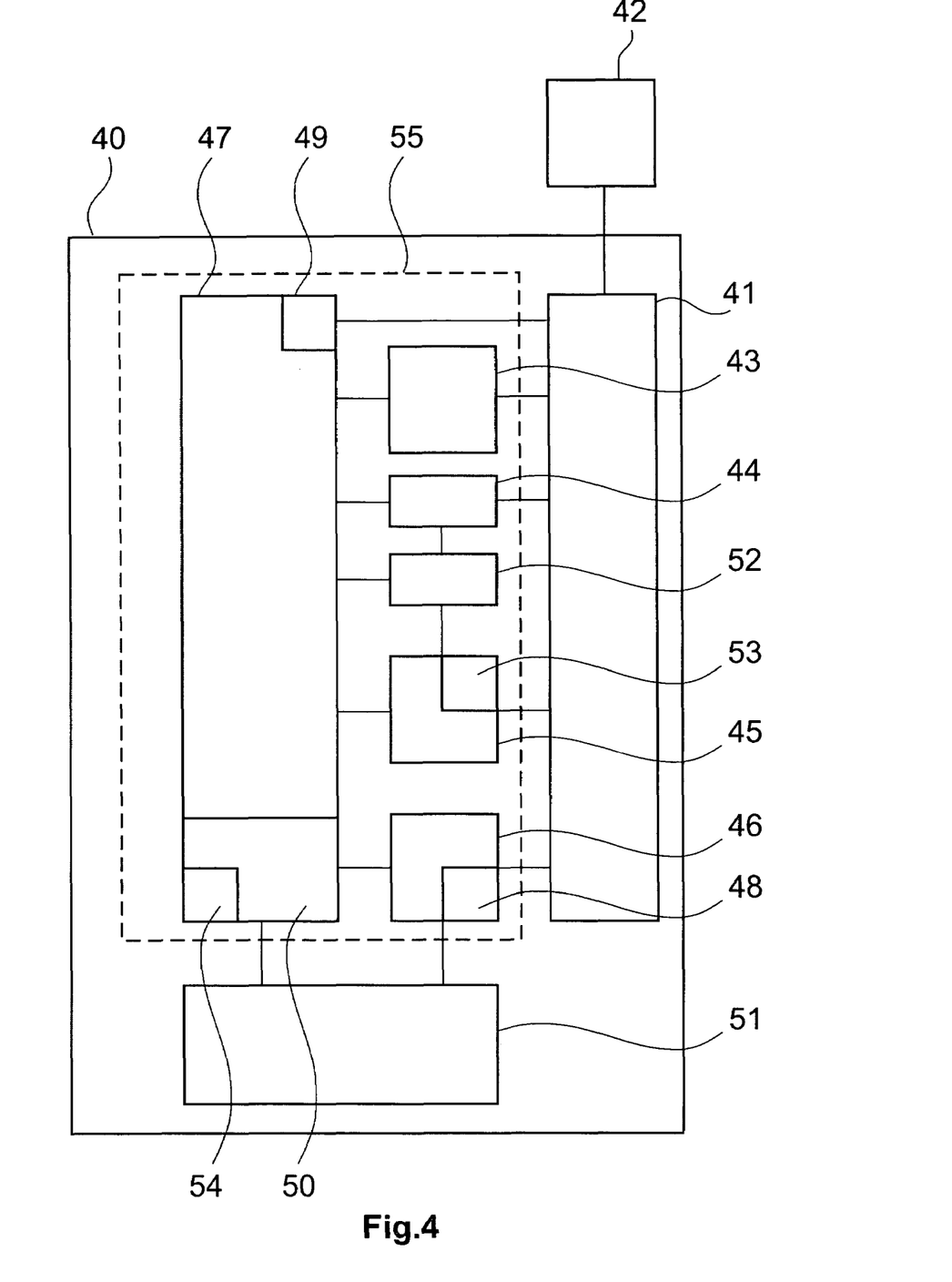
FIG. 4 shows a block diagram of a device for determining electronic information about PHY transmission speeds.

FIG. 4 shows an exemplary embodiment of a device 40 for determining the PHY transmission speeds between nodes in an acyclical network. The device can be embodied both using hardware and with a combination of hardware and software.

The device 40 comprises a storage medium 41 which is linked to reception means 42 of the node in which the device is arranged. The self-ID packets which are received using the reception means are stored in the storage medium. Alternatively, it is also possible to store only the topology information acquired during an evaluation and information about the PHY speeds of the nodes of the network in the storage medium.

The device 40 comprises starting node definition means 43, switching node definition means 44, destination node definition means 45 and speed determining means 46 which are each linked to the storage medium 41 in such a way that, when a current starting node, destination node or switching node is defined, or when the PHY transmission speed from the current starting node to the current destination node is determined, the data which is stored in the storage medium can be read in and used.

The device 40 also comprises a switching node ID stack memory 42 for buffering ID code numbers of nodes. The switching node ID stack memory 52 is linked to the switching node definition means 44, the destination node definition means 45 and the control means 47.

The starting node definition means 43, switching node definition means 44, destination node definition means 45, the speed determining means 46 and the switching node ID stack memory 52 are controlled by control means 47 in order to define the current starting, destination and switching nodes and determine the PHY transmission speed from the current starting node to the current destination node in accordance with the method described above. The destination node definition means 45 also comprise selection means 53 for making a pre-selection from the set of adjacent nodes of the current switching node to which a PHY transmission speed from the current starting node has not yet been determined so that when a current destination node is determined, only nodes with an ID code number which is higher than the ID code number of the current starting node are taken into account.

The speed determining means 46 comprise PHY speed determining means 48 for determining the PHY speed of nodes. The speed determining means are provided for determining a minimum value of PHT speeds. The control means 47 also comprise topology determining means 49 for determining the topology of the network. The determination of the topology includes, for example, the determination of the ID code numbers of the nodes to which a PHY transmission speed from the starting node has not yet been determined, or the determination of the ID code number of the current starting node, of the current switching node or of the current destination node.

The control means 47 include optimization means 50 for acquiring a PHY transmission speed to nodes of the set of the nodes to which the PHY transmission speed from the current starting node has not yet been determined, on the basis of the information which is determined by the topology determining means 49 and the PHY speed determining means 48.

The optimization means also comprise maximum ID determining means 54 for determining an ID code number of a node with a maximum ID code number from a set of the nodes to which the PHY transmission speed from the current starting node has already been determined.

A microprocessor 55 may include the control means 47, the starting node definition means 43, the switching node definition means 44, the destination node definition means 45, the switching node ID stack memory 52 and the speed determining means 46.

The information about PHY transmission speeds which is determined using the speed determining means 46 or the optimization means 50 in accordance with the method described above is stored in a table memory 51. Here, said information is available in order to be able to determine at any time an optimum transmission speed for an exchange of data between any desired nodes of the network.

The described method for determining a table with information about the PHY transmission speeds between nodes of a network and a device for carrying out the method have been described in conjunction with the IEEE 1394 standard. However, they can also be used in conjunction with any desired network standards with similar configuration properties to the IEEE 1394 standard in order to obtain the explained advantages. The data throughput rate of the network from any desired electric/electronic devices such as computers, printers, scanners, CD disk drives, hard disk drives and home entertainment electronics devices such as video cameras or televisions is improved for a user.

What is claimed is:

1. A method for acquiring electronic information about transmission speeds between nodes of an acyclical network, in particular an IEEE 1394 bus network, precisely one dedicated transmission path being present between each two of the nodes of the network, and a respective physical layer transmission speed, hereinafter called PHY speed of the transmission link along said transmission path being determined by a minimum value of PHY speeds of the nodes of the network lying on the transmission path, the respective PHY speed being determined for one subset of the transmission links in the network by acquiring the PHY speeds of the nodes lying on the transmission paths and electronically acquiring minimum values of the PHY speeds; and the respective PHY speed being electronically determined for another subset of the transmission links, which differs from the one subset of the transmission links, on the basis of one of the PHY speeds which have been acquired for the nodes lying on the transmission paths of the one subset, and electronic topology information about a topology of the network being electronically determined using minimum value determining means for PHY speeds which are formed in one of the nodes of the network.

2. The method as claimed in claim 1, wherein an electronic table is formed from the acquired electronic information about the PHY speeds, and the electronic table is stored in a table memory.

3. The method as claimed in claim 1, wherein the PHY speeds which have already been acquired are taken into account during the electronic acquisition of the minimum values of the PHY speeds of the nodes lying on the respective transmission paths of the one subset.

4. The method as claimed in claim 1, wherein each of the nodes is assigned an ID code number and each node is directly connected to a number of adjacent nodes, the adjacent nodes being able to comprise a maximum of one parent node and no, one or a plurality of children nodes, and the ID code number or each of the nodes being higher than the ID code numbers of all its children nodes, the following steps being carried out automatically using a device which is arranged in one of the nodes of the network:

a) a node with a lowest ID code number is defined from a set of the nodes for which the PHY speeds to all the nodes have not yet been determined, as a current starting node and as a current switching node;

b) a node with a highest ID code number is defined from a set of the adjacent nodes of the current switching node to which a PHY speed from the current starting node has not yet been determined, as a current destination node if this set is not empty, and otherwise the step e) is carried out;

c) the PHY speed (SPD) from the current starting node to the current destination node is acquired:

d) the ID code number of the current destination node is stored in a switching node ID stack memory and the step b), is iterated;

e) an ID code number is read in from the switching node ID stack memory and the associated node is defined as a current switching node and the steps b) to d) are iterated for as long as the switching node ID stack memory still contains at least an ID code number of a node;

f) the steps a) to e) are repeated for as long as the set of the nodes for which all the PHY speeds to all the nodes have not yet been determined comprises at least two nodes.

5. The method as claimed in claim 4, wherein, when the current destination node is defined from the set of the adjacent nodes for which a PHY speed from the current starting node has not yet been determined, nodes whose ID code number is lower than the ID code number of the current starting node are not taken into account, and the values of the PHY speeds from the current starting node to the nodes whose ID code number is lower than the ID code number of the current starting node are set to be equal to the corresponding values of the PHY speeds from the respective nodes whose ID code number is lower than the ID code number of the current starting node to the current starting node.

6. The method as claimed in claim 4, wherein a value of a PHY speed of the current starting node is acquired and if this value is unknown or corresponds to the minimum network speed, the values of the PHY speeds from the current starting node to nodes of the set of the nodes to which the PHY speed from the current starting node are set to be equal to the value of the PHY speed of the current starting node.

7. The method as claimed in claim 4, wherein a value of a PHY speed of the current destination node is acquired and if the value of the PHY speed of the current destination node is unknown or equal to the value of the minimum network speed, and the current destination node is the parent node of the current starting node, the values of the PHY speeds from the current starting node to nodes whose ID code number is higher than the ID code number of the current starting node are set to be equal to the value of the PHY speed of the current destination node.

8. The method as claimed in claim 4, wherein a value of a PHY speed of the current switching node is acquired, and if the value of the PHY speed of the current switching node is unknown or corresponds to the minimum network speed, the values of the PHY speeds from the current starting node to nodes of the set of the nodes to which the PHY speed from the current starting node is not yet determined and whose ID code number is higher than the ID code number of the current starting node and lower than the ID code number of the current switching node are set to be equal to the value of the PHY speed of the current switching node.

9. The method as claimed in claim 8, wherein a maximum ID code number of a node of a set of the nodes to which the PHY speed from the current starting node has already been determined is determined, and if the ID code number of the current switching node is equal to the maximum ID code number and the value of the PHY speed of the current switching node is unknown or corresponds to the minimum network speed, the values of the PHY speeds from the current starting node to nodes with an ID code number higher than the ID code number of the current switching node is set to be equal to the value of the PHY speed of the current switching node.

10. A device for acquiring electronic information about transmission speeds between nodes of an acyclical network, in particular an IEEE 1394 bus network, precisely one transmission path being present between each two of the nodes of the network, and the transmission speed on the physical layer, hereinafter called PHY speed of the transmission link for the transmission path being defined by a minimum value of PHY speeds of the nodes of the network lying on the transmission path, having PHY speed determining means for electronically acquiring the PHY speeds of the nodes lying on the transmission paths, and first minimum value determining means for electronically determining the minimum values of the PHY speeds of the nodes lying on the respective transmission paths, defined by control means for electronically determining the PHY speeds for a subset of the transmission links in the network on the basis of the acquired minimum values of the PHY speeds of the nodes lying on the transmission paths, and second minimum value determining means for electronically determining the PHY speeds for a different subset of the transmission links, which differs from the one subset, on the basis of one of the electronically acquired PHY speeds of the nodes lying on the transmission paths of the one subset, and by using topology determining means of acquired electronic topology information about a topology of the network.

11. The device as claimed in claim 10, defined by a table memory for storing an electronic table of the acquired electronic information about the PHY speeds.

12. The device as claimed in claim 10, wherein each of the nodes is assigned an ID code number and each node is directly connected to a number of adjacent nodes, the adjacent nodes being able to comprise at maximum of one parent node and no, one or a plurality of children nodes, and the ID code number of each of the nodes being higher than the ID code numbers of all of its children nodes, and the device comprising the following:

- a storage medium which is connected to the control means, for storing electronic information, the electronic information comprising topology information about the network and PHY speed information for the nodes;
- starting node definition means, connected to the storage medium and the control means, for determining a current starting node from a set of the nodes for which a PHY speed to all the other nodes has not yet been determined, and for defining the current starting node as the current switching node;
- a switching node ID stack memory, connected to the control means, for buffering ID code numbers;
- destination node definition means, connected to the storage medium, the control means and the switching node ID stack memory, for defining a node with a highest ID code number from a set of the adjacent nodes of the current switching node, for which the PHY speed from the current starting node has not yet been determined, as a current destination node, if this set is not empty;
- switching node definition means, connected to the storage medium, of the control means and the switching node ID stack memory, for defining the current switching node on the basis of the ID code numbers stored in the switching node ID stack memory;

the control means being connected to the storage medium, to the starting node definition means, to the destination node definition means, to the switching node definition means, to the switching node ID stack memory and to the first minimum value determining means for controlling the destination node definition means, and to the second minimum value determining means as a function of a current combination of a set of the adjacent nodes of the current destination node for which a PHY speed from the current starting node has not yet been determined, for controlling the switching node definition means as a function of a content of the switching node ID stack memory, and for controlling the starting node definition means as a function of a current combination of a set of the nodes for which a PHY speed to all the other nodes has not yet been determined.

13. The device as claimed in claim 12, wherein the destination node definition means comprise selection means for making a preselection from the set of adjacent nodes of the current switching node for which a PHY speed from the current starting node has not yet been determined, with the result that, when a current destination node is defined, only nodes with an ID code number which is higher than the ID code number of the current starting node are taken into account.

14. The device as claimed in claim 10, wherein the second minimum value determining means comprise maximum ID determining means for determining an ID code number of a node with a maximum ID code number from a set of nodes for which the PHY speed from the current starting node has already been acquired.

15. The device as claimed in claim 12, wherein a microprocessor comprises the control means, the starting node definition means, the switching node definition means, the destination node definition means, the switching node ID stack memory and the first minimum value determining means.

* * * * *